(12) United States Patent
Tachibana et al.

(10) Patent No.: US 6,843,362 B2
(45) Date of Patent: Jan. 18, 2005

(54) ZONE CONTROLLER

(75) Inventors: Toshiyuki Tachibana, Kasai (JP); Shinji Furotani, Kasai (JP)

(73) Assignee: Itoh Electric Company Limited (JP)

( * ) Notice: Subject to any disclaimer, the term of this patent is extended or adjusted under 35 U.S.C. 154(b) by 0 days.

(21) Appl. No.: 10/312,186

(22) PCT Filed: Jun. 25, 2002

(86) PCT No.: PCT/JP02/06372
§ 371 (c)(1), (2), (4) Date: Dec. 20, 2002

(87) PCT Pub. No.: WO03/002436
PCT Pub. Date: Jan. 9, 2003

(65) Prior Publication Data
US 2004/0003982 A1 Jan. 8, 2004

(30) Foreign Application Priority Data
Jun. 27, 2001 (JP) ........................................ 2001-194363

(51) Int. Cl.[7] ........................ B65G 43/00; B65G 47/26; B65G 47/31; B65G 13/06

(52) U.S. Cl. .............................. 198/460.1; 198/781.05; 198/781.06

(58) Field of Search ........................ 198/460.1, 781.01, 198/781.05, 781.06, 783, 792

(56) References Cited

U.S. PATENT DOCUMENTS

| | | | | |
|---|---|---|---|---|
| 3,716,129 A | * | 2/1973 | Sadler, Jr. .............. | 198/781.09 |
| 4,819,788 A | * | 4/1989 | Van Der Schie ....... | 198/781.06 |
| 5,042,644 A | * | 8/1991 | Davis ...................... | 198/781.1 |
| 5,228,558 A | * | 7/1993 | Hall ........................... | 198/784 |
| 5,318,167 A | * | 6/1994 | Bronson et al. ............ | 198/577 |
| 5,862,907 A | * | 1/1999 | Taylor .................. | 198/781.05 |
| 6,021,888 A | * | 2/2000 | Itoh et al. ................. | 198/783 |
| 6,047,812 A | * | 4/2000 | Horn et al. ............ | 198/781.06 |

* cited by examiner

Primary Examiner—Gene O. Crawford
(74) Attorney, Agent, or Firm—Wood, Phillips, Katz, Clark & Mortimer

(57) ABSTRACT

A zone controller enabling flexible conveyance according to the use by simple change of setting. An aspect of the invention is a zone controller 10 for a particular zone picked from a plurality of zones for control into which a roller conveyor line 1 is divided and which are arrangeable in a row in the direction of conveyance, being capable of controlling operation of a driving roller 4a for conveyance provided in the particular zone, having a mode-setting means 14 capable of switching between a slug mode and a singulation mode. In the slug mode, operation of the driving roller is controlled so that articles in the zones are conveyed uniformly to downstream, maintaining the order of the articles in the conveying line. In the singulation mode, operation of the driving roller is controlled so that the articles are conveyed separately to downstream with a predetermined number of zones in which no article exists preserved between the zones in which the articles exist.

12 Claims, 7 Drawing Sheets ated in the particular zone, having a mode-setting means capable of switching between a slug mode and a singulation mode: wherein in the slug mode operation of the driving roller is controlled so that articles in the zones are conveyed uniformly to downstream, maintaining the order of the articles in the conveying line; and wherein in the singulation mode operation of the driving roller is controlled so that the articles are conveyed separately to downstream with a predetermined number of zones in which no article exists kept between the zones in which the articles exist.

ZONE CONTROLLER

BACKGROUND OF THE INVENTION

1. Field of the Invention

The present invention relates to a zone controller for use in a zone controlled conveyor system. More specifically, it relates to a zone controller that facilitates the change of the conveying mode through simple change of setting according to need.

2. Description of Related Art

A conventional roller conveyor system that has a conveying line divided into a plurality of control zones (zones for control), each zone having a zone controller for controlling conveyance is disclosed, for example, in Japanese Laid-open Patent Application No. Hei. 11-199030.

The conventional roller conveyor system is equipped with a motorized roller and "free rollers" both for conveyance, the motorized roller and free rollers connected by belts spanned over them. Each unit has a photoelectric switch for detecting the presence of article and a "motor driver", i.e., a controller, for controlling operation of the motorized roller.

Each of the zone controllers, connected electrically to others, drives, brakes and stops the rotation of the roller depending on the signal of presence of article of its home zone (i.e., the zone corresponding to the zone controller) and taking into account the signals of presence etc. transmitted from upstream and downstream zones. Such cooperative control by zone controllers achieves the "zero-pressure accumulating control" that enables conveying articles avoiding collision between articles.

So as to achieve an efficient conveyance, it is important for a conveyor line performing zero-pressure accumulating conveyance to convey articles with intervals as short as possible.

On the other hand, for example in the case that examinations of conveyed articles should be carried out at some working location along the conveyor line, it is required to prolong the time intervals between the arrivals of the conveyed articles at the location, so as to adjust the conveying situation of the articles on the line to the operations and the like in the examination.

Such a conveying mode that prolongs the time intervals between the arrivals of the conveyed articles at a particular location, maintaining a predetermined conveying speed, have not been fully devised, though conventional conveyor systems can stop conveyance at particular zone or vary the conveying speed of the whole conveyor line.

In the case that one wishes to prolong the time intervals between the arrivals of articles, one should either prepare zone controllers with different controlling specification or change the conveying modes of zone controllers by using a separately positioned supervisory or superordinate controller and the like.

It has been difficult to suitably adjust the time intervals between the arrivals of articles responding to the work required in the conveyor line, thus requiring a lot of time and expense in constructing systems. Improvement has been desired.

The invention disclosed in this application is proposed in consideration of the above-mentioned situations, aiming to provide a zone controller that facilitates change of the intervals between the conveyed articles.

SUMMARY OF THE INVENTION

An aspect of the zone controller of the present invention proposed for achieving the aim described above is a zone controller for a particular zone picked from a plurality of zones for control into which a roller conveyor line is divided and which are arrangeable in a row in the direction of conveyance, being capable of controlling operation of a driving roller for conveyance provided in the particular zone, having a mode-setting means capable of switching between a slug mode and a singulation mode: wherein in the slug mode operation of the driving roller is controlled so that articles in the zones are conveyed uniformly to downstream, maintaining the order of the articles in the conveying line; and wherein in the singulation mode operation of the driving roller is controlled so that the articles are conveyed separately to downstream with a predetermined number of zones in which no article exists kept between the zones in which the articles exist.

Here, the zone controller of the invention is suitably used in a roller conveyor line that performs the zero-pressure accumulation in which collision between conveyed articles is avoided by carrying out controls in the control zones cooperatively between the zones when the articles are conveyed downstream. It is preferable that conveyance in uniform speed is performed over the zones.

Each control zone does not need to be a discrete unit. For example, a conveyor unit may have a plurality of control zones, each zone equipped with a driving roller for conveyance.

When articles are conveyed by a roller conveyor, conveying efficiency increases if conveying speed is increased and the articles are conveyed with less intervals. However, there occurs the case in which time intervals of arrival of articles at particular location on the conveyor line are required to be changed.

For example, in the case of attaching other members to an article conveyed on the line and returning the article to the line or in the case of examining the article, the time interval of arrival of the articles should match the time required for the work. If the time interval is shorter than the work time, the articles accumulate toward upstream as article arrive one after another during the work. If the time interval is longer than the work time, working efficiency decreases as waiting time occurs after completion of the work and before arrival of the next article.

The zone controller of the invention is capable of altering the conveying mode by switching between the slug mode and the singulation mode through mode-setting means.

In the slug mode as to the invention, if the control zones where articles exist follow one another with no intervening zone having no article, the articles are conveyed downstream uniformly as they stand, substantially with no intervals between the articles. If zones having no article intervene between the zones where articles exist, the articles are conveyed downstream uniformly as they stand, maintaining the order.

The singulation mode means that the articles are conveyed separately to downstream with a predetermined number of zones having no article kept between the zones having the articles.

By means of the zone controller of the invention, if articles arrive from upstream one after another substantially with no intervals, controlled by a zone controller set in the slug mode, a particular control zone, to which a zone controller set in the singulation mode belongs, conveys articles to downstream separately, generating zones having no article.

In the singulation mode, for example, it is possible to convey articles generating only one control zone having no article between the zones having the articles.

By means of the zone controller capable of switching between slug mode and singulation mode, conveying mode in which time intervals of arrival of articles are altered without changing the conveying speed in each zone is accomplished.

In the present invention, the zone controller may be capable of receiving presence signals and a driving status signal, the presence signals indicating whether an article exists in the particular zone, in a zone upstream of the zone, and in a zone downstream of the zone, the driving status signal indicating a driving status of a driving roller for conveyance in a zone downstream of the zone; and the zone controller may generate a controlling signal for controlling operation of the driving roller in the particular zone, taking the presence signals into account if the mode-setting means is switched in the singulation mode, taking the presence signals and the driving status signal into account if the mode-setting means is switched in the slug mode.

By the construction, the zone controller for the particular control zone (home zone) set in the slug mode takes in the presence status of the control zones referring to presence signals and takes in the driving status of downstream referring to the driving status signal of downstream.

Thus, even if an article exists in the downstream control zone, an article in the home zone can be conveyed downstream in the slug mode in accordance with the conveyance of the article in the downstream zone, taking the driving status signal into account.

In the singulation mode, articles are conveyed downstream taking into account the presence signals of upstream and downstream and with intervals so that articles do not exist both in the home zone and the downstream zone at the same time.

In the slug mode, for example, the following control is performed taking into account presence signals and driving status signal.

In the case that the driving status signal of the downstream control zone is "halt", controlling signal for driving the driving roller is generated, if no article exists in the home zone and articles exist in both of the immediately upstream and downstream zones, or if any article exists in either or both of the home zone and the immediate upstream zone and no article exists in the downstream zone.

In the case that the driving status signal of the downstream control zone is "run", controlling signal for driving the driving roller is generated, if any article exists in either or both of the home zone and the immediate upstream zone.

In the slug mode, in the case that the driving status signal of the downstream control zone is "halt", the driving roller is driven, if no article exists in the home zone and articles exist in both of the immediately upstream and downstream zones, thus achieving zero-pressure accumulation conveyance in which articles are accumulated toward upstream tightly and with no collision if conveyed articles will accumulate in the downstream.

By the control, the driving rollers in the control zones in which the driving roller need not be driven (i.e., the control zones that neither convey articles to downstream nor receive articles from upstream) are not driven, reducing power waste.

On the other hand, in the singulation mode, for example, the following control can be carried out taking into account the presence signals.

If any article exists in the downstream zone, no article exists in the home zone, and any article exists in the upstream zone, or if no article exists in the downstream zone and any article exists in either or both of the home zone and the upstream zone, control is performed so that controlling signal for driving the driving roller is generated.

By the control, it is possible to convey articles downstream separately, generating only one control zone having no article between the zones having the articles.

In the singulation mode, if no article exists in the downstream zone and any article exists in either or both of the home zone and the upstream zone, the driving roller is driven. Zero-pressure accumulation conveyance, in which articles are accumulated toward upstream tightly and with no collision if articles accumulate in downstream, is thus achieved.

Also by the control, the driving rollers in the control zones in which the driving roller need not be driven are not driven, reducing power waste.

Another aspect of the zone controller of the invention, proposed simultaneously, is a zone controller for a particular zone picked from a plurality of zones for control into which a roller conveyor line is divided and which are arrangeable in a row in the direction of conveyance, being capable of controlling operation of a driving roller for conveyance provided in the particular zone including: an input section for input of a driving status signal indicating a driving status of a driving roller for conveyance in a zone other than the particular zone; a calculating section for receiving a plurality of signals and for generating, based on the signals, a controlling signal for controlling operation of the driving roller, the signals including the driving status signal transmitted to the input section; and a mode-setting means for switching modes of control of operation of the driving roller by selecting whether the driving status signal is involved in the calculation by the calculating section.

By the construction, the zone controller for the particular control zone can take a driving status signal of another control zone via the input section into account. Switching of the mode-setting means determines whether to take the driving status signal into account in the calculating section. Thus the calculating section can generate and output controlling signals in accordance with the setting of the mode-setting means so as to switch the controlling mode of the driving roller, enabling conveyance control in different modes.

In the invention, the zone controller may further include an output section for output of a driving status signal indicating driving status of a driving roller for conveyance in the particular zone.

By the construction, the zone controller for the particular control zone can transmit a driving status signal to another control zone via output section.

Thus a different mode of conveyance control can be carried out in another control zone using the driving status signal of the particular zone.

In the invention, the calculating section may perform calculation, taking into account the driving status signal of a zone downstream of the particular zone inputted via the input section if the mode-setting means is switched in the slug mode, and not taking into account the driving status signal of the downstream zone if the mode-setting means is switched in the singulation mode.

Thus the calculating section can generate and output controlling signal for the driving roller for performing the slug mode conveyance or the singulation mode conveyance by only switching the setting of mode.

In the invention, the zone controller may further include an upstream connector for connection to a zone controller of a zone upstream of the particular zone and a downstream connector for connection to a zone controller of a zone downstream of the particular zone, wherein each of the upstream and downstream connectors may accommodate at least one selected from the input section and the output section.

By this construction, the downstream connector of the home zone and the upstream connector of the downstream zone are connected via cables and the upstream connector of the home zone and the downstream connector of the upstream zone are connected via cables. In other words, adjoining pairs of the zone controllers are connected via cables in series. By such connection, signals including driving status signals is capable of being transmitted mutually between the controllers via the cables.

Still another aspect of the invention relates to a zone controller for controlling a first driving motor for conveyance in a first conveyor unit that defines a zone forming a part of a conveyor line. The zone controller includes: a calculating circuit for generating a first driving status signal indicating whether to actuate the first driving motor of the first conveyor unit by calculation using a plurality of parameters; an input terminal for inputting a second driving status signal, which is generated by another calculating circuit of another zone controller for controlling a second driving motor for conveyance in a second conveyor unit, as one of the parameters; and a setting device for deciding whether to use the second driving status signal in the calculation. The first conveyor unit and the second conveyor unit may be of the same construction and the zone controllers related to the conveyor units may be of the same construction. The calculating circuit may be formed as a combination of logic ICs such as AND circuits and OR circuits. The calculating circuit may also be formed as a microcomputer mounted with a logic calculation program.

The setting device may be a switch provided along a signal line for transmitting the second driving status signal, which is inputted via the input terminal, to the calculating circuit. The setting device may be formed so as to validate or invalidate a portion of the circuit that deals with the second driving status signal. Alternatively, the device may be formed so as to change the flow of the calculating program by means of a software switch.

The zone controller of the invention may further include a motor-controlling circuit connected electrically to the first driving motor and for receiving the first driving status signal. The motor-controlling circuit may be capable of generating, based on the first driving status signal, a drive control signal that actuates or halts the first driving motor and outputting the drive control signal to the first driving motor. The drive control signal may be, for example, three-phase current signal. The motor-controlling circuit and the calculating circuit may be mounted on a common substrate. The zone controller of the invention does not need include the motor-controlling circuit. In this case, a discrete motor-controlling circuit may be connected between the zone controller and the motor.

The parameters may include the second driving status signal, a first presence signal indicating whether an article exists on the first conveyor unit, a second presence signal indicating whether an article exists on the second conveyor unit, and a third presence signal indicating whether an article exists on a third conveyor unit. The second conveyor unit may define a zone downstream of the first conveyor unit and the third conveyor unit may define a zone upstream of the first conveyor unit.

The setting device is capable of switching the calculating circuit between a first control mode and a second control mode, wherein in the first control mode the calculating circuit generates the first driving status signal RUN by a logic calculation shown in formula 1 identified below, whereas in the second control mode the calculating circuit generates the first driving status signal RUN by a logic calculation shown in formula 2 identified below. Here, the first presence signal, the second presence signal, the third presence signal, and the second driving status signal being represented by S-SNS, D-SNS, U-SNS, and D-RUN, respectively. The first driving status signal RUN, which is the result of the calculation, is represented by RUN.

$$RUN=((D-RUN)rev \cdot D\text{-}SNS \cdot S\text{-}SNS+(S\text{-}SNS+U\text{-}SNS)rev)rev \quad \text{(Formula 1)}$$

$$RUN=(D\text{-}SNS \cdot S\text{-}SNS+(S\text{-}SNS+U\text{-}SNS)rev)rev \quad \text{(Formula 2)}$$

The first control mode corresponds to the above-described slug conveyance mode and the second control mode corresponds to the above-described singulation conveyance mode.

The zone controller may further include a second setting device being capable of changing the calculating circuit into a third control mode in which the calculating circuit generates the first driving status signal RUN by a logic calculation shown in formula 3 identified below.

$$RUN=(S\text{-}SNS+(S\text{-}SNS+U\text{-}SNS)rev)rev \quad \text{(Formula 3)}$$

By switching the zone controller in the third control mode by means of the second setting device, the conveyed article is stopped and forbidden to be conveyed downstream at the moment it is conveyed into the home zone because the driving motor for the home zone is actuated only when no article exists in the home zone and an article exists in the upstream zone. Therefore, the worker can carry out examination and other operations with the article stopped, by setting the zone where the article undergoes examination in the third control mode. After completing the examination, the worker can bring back the article to normal conveyance by pushing the article downstream with his/her hands or by switching the second setting device.

THE PREFERRED EMBODIMENTS OF THE INVENTION

Now some preferred embodiments of the present invention will be described referring to the accompanying drawings.

Figure 1:
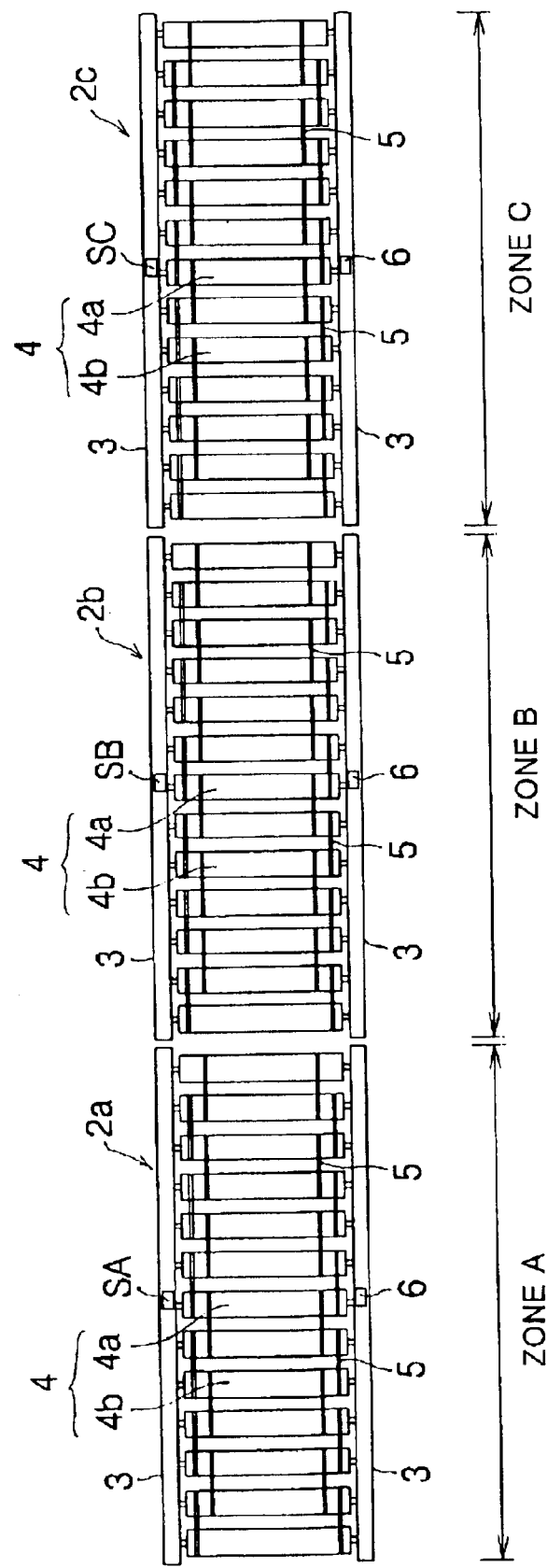
FIG. 1 is a plan view of a zone controlled conveyor system incorporating the zone controllers embodying the invention.

FIG. 1 illustrates a roller conveyor system 1 forming a conveyor line suitably made up of zone controllers embodying the invention.

The conveyor line is divided into a plurality of control zones including zones A, B, and C, having conveyor units 2a, 2b, and 2c, respectively.

Drive of the conveyor line is controlled centrally by means of a supervisory controller that is, for example, a programmable logic controller (P. L. C.). The supervisory controller supplies each line with command signals (external input signals) such as RUN/STOP signal dictating whether to actuate or halt the whole line and CW/CCW signal dictating the conveying direction so as to control the operation of whole conveyor line based on these signals.

Each of the control zones A, B, C ensure cooperated conveyance as a united conveyor line as well as discretely control conveyance based on signals such as detecting signals of sensors and signals transmitted from the upstream and the downstream control zones.

Each of the conveyor units 2a, 2b, 2c is made up of a plurality of conveying rollers 4, for conveying articles thereon, which are supported rotatably each through a shaft and between a pair of side frames 3, 3, positioned parallel on each side. The rollers are arranged in a row in the direction of conveyance at a predetermined intervals. The rollers 4 consist of idle rollers 4b that can rotate freely and motorized rollers 4a (driving roller for conveyance) that incorporate driving motors for conveyance. Driving belts 5 are spanned over each adjoining rollers 4 so as to transmit driving forces of the motorized rollers 4a to all the idle rollers 4b.

In this embodiment, one motorized roller 4a is positioned at the central part of each unit, the other rollers being idle rollers 4b.

In the control zone A, a presence sensor SA is attached to a side frame 3. A photoelectric sensor may be employed as the presence sensor, with a light-emitting device 6, such as a light-emitting diode and an infrared-emitting diode, situated on the opposed side frame. Thus it is possible to detect that an article is conveyed to a predetermined position because the photoelectric sensor turns ON or OFF as light from the light-emitting device is intercepted by the conveyed article. In other words, output of the presence sensor SA is used as a presence signal indicating whether an article is in the control zone A.

The presence sensor SA, situated at the center in the conveying direction in the control zone A, detects whether the leading end of an article has reached to the center in the conveying direction in the control zone A. Each conveyor unit in zone B and zone C is equipped with a presence sensor SB, SC, respectively, similar to the sensor SA, with a light-emitting device 6 equipped on the position opposite to the sensors SB, SC. Each of these presence sensors SA, SB, SC outputs "ON" (H level) signal if it detects an article and outputs "OFF" (L level) signal if there is no article.

Figure 2:
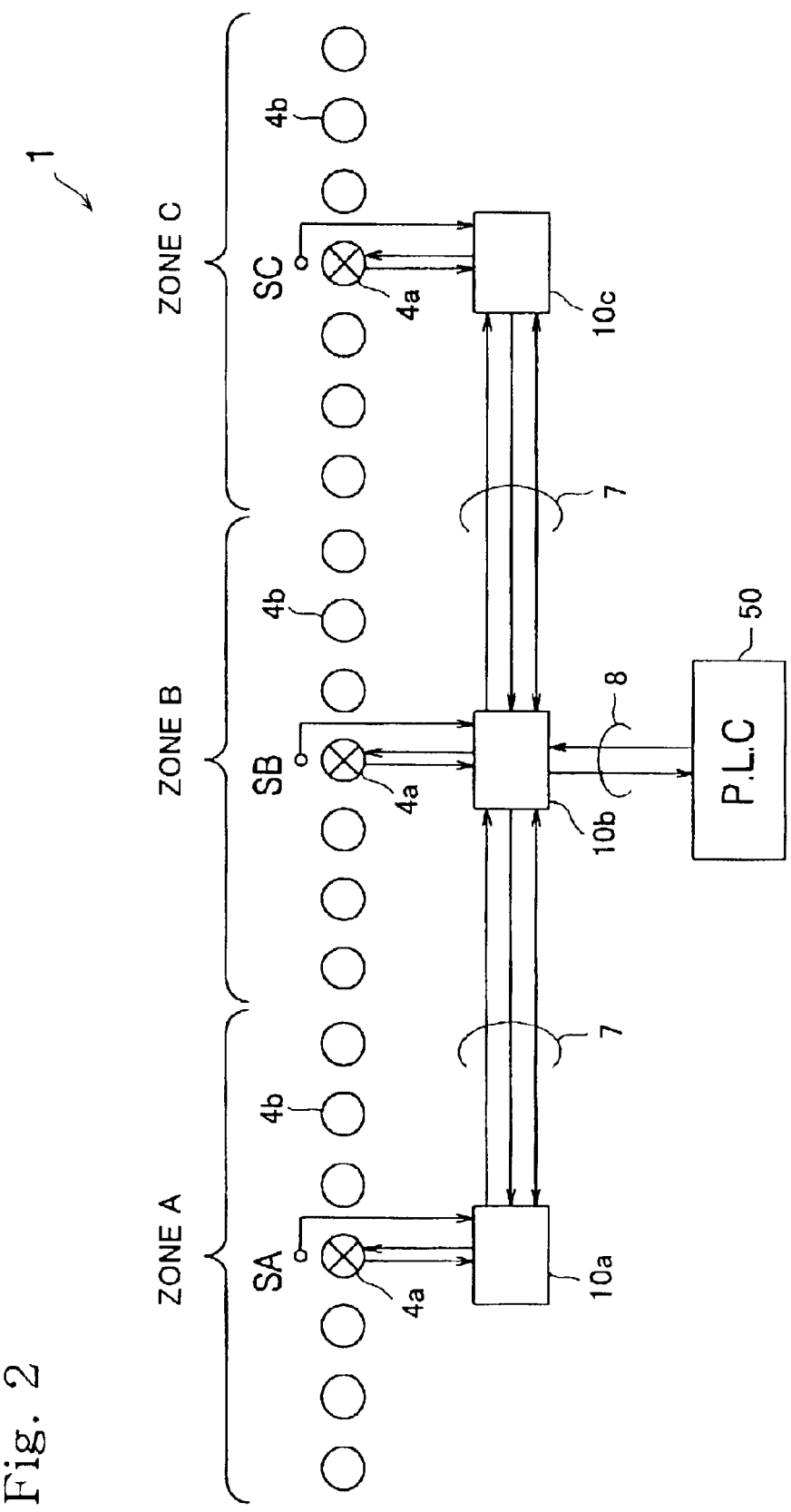
FIG. 2 is a wiring diagram of the substantial part of the conveyor system shown in FIG. 1.

As shown in FIG. 2, zone controllers 10a, 10b, 10c, each for controlling a motorized roller 4a, are provided corresponding to the conveyor units 2a, 2b, 2c, respectively. Signal cables 7 connect between adjoining zone controllers 10a, 10b, 10c. A supervisory controller 50 is connected to the zone controller 10b via signal cables 8.

Figure 3:
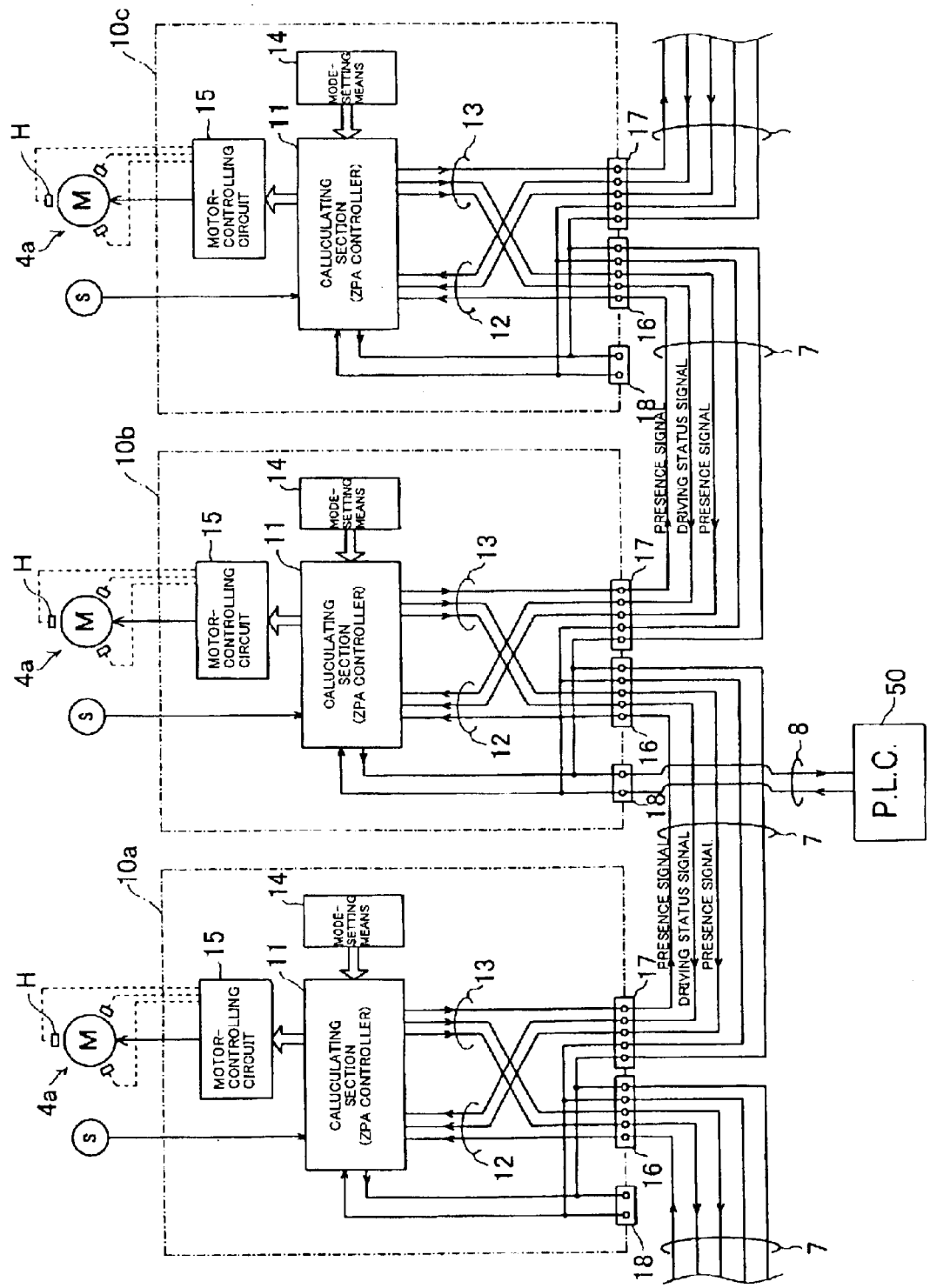
FIG. 3 is a diagram illustrating construction and wiring of the zone controllers employed in the conveyor system shown in FIG. 1.

FIG. 3 is a diagram illustrating internal structure and wiring of the zone controllers 10a, 10b, 10c in more detail corresponding to FIG. 2. The details of structure and operation of the zone controllers will be described referring to the figure.

The zone controllers 10a, 10b, 10c are of the same construction, each including a calculating section 11, an input section 12, an output section 13, a mode-setting means 14, and a motor-controlling circuit 15. Each of the controllers also has an upstream connector 16 and a downstream connector 17, each for connecting to an adjacent zone controller, and a "supervisory" connector 18 for transmitting signals to and from a supervisory controller 50.

The input section 12 comprises connecting terminals for signals inputted from another zone controller via the upstream connector 16 or the downstream connector 17, whereas the output section 13 comprises connecting terminals for signals outputted to another zone controller via the upstream connector 16 or the downstream connector 17.

The calculating section 11, including a calculating circuit that is a ZPA controller for performing a zero-pressure accumulating control (ZPA control), generates a controlling signal for controlling the motorized roller 4a taking into account either or both signals consisting of a signal inputted via the input section 12 and a signal outputted via the output section 13, so as to output the controlling signal to the motor-controlling circuit 15.

The calculating section 11 also receives external output signals such as RUN/STOP signal and CW/CCW signal from the supervisory controller, generates a necessary controlling signal, and outputs the controlling signal to the motor-controlling circuit 15.

The mode-setting means 14 sets the selection of signals to be taken into account in the calculating section 11. More specifically, the mode-setting means 14 can switch and set slug mode, singulation mode, and conveyance-forbidding mode so as to select signals to be taken into account in the calculating section 11 in accordance with the setting.

Instead of switching the signals to be taken into account in the calculating section 11 in accordance with the mode setting by the mode-setting means 14, as in this embodiment, the calculating circuit in the calculating section 11 may be changed in accordance with the mode setting.

As shown in FIG. 3, the motor-controlling circuit 15 controls the motor M, receiving the controlling signal from the calculating section 11 and a detecting signal of a Hall element (pole position detecting element) positioned in a brushless motor M incorporated in the motorized roller 4a.

Signals that should be transmitted and received between the zone controllers 10 may be determined at user's discretion.

In the zone controller 10 of the embodiment, three signals, i.e., a presence signal of the upstream zone controller 10a (a third presence signal), a presence signal of the downstream zone controller 10c (a second presence signal), and a second driving status signal, are transmitted via the input section 12 of the upstream connector 16 and the downstream connector 17, as shown in FIG. 3.

On the other hand, a presence signal and a driving status signal outputted from the calculating section 11 of the zone controller 10b are transmitted to other zone controllers 10a, 10b via the output section 13 of the upstream connector 16 and the downstream connector 17.

As described above, the presence signals are the detecting signals of the presence sensors SA, SB, SC positioned in the control zones. The signal outputted from the logic circuit (described later) so as to control the driving roller is employed as the driving status signal.

Any pair selected from the zone controllers 10a, 10b, 10c are attachable and detachable easily by means of the same set of cables 7, as shown in FIG. 3. In other words, it is easy to make connections by sets of cables 7 because the cables 7 may be connected so as to bridge between zone controllers 10a, 10b, 10c in series. By connection with the cables 7 in this manner, each zone controller 10 can take into account the driving status signal of downstream and the presence signals of both upstream and downstream.

The command signals (RUN/STOP signal and CW/CCW signal) from the supervisory controller are transmitted via signal lines 8 to the "supervisory" connector 18 of the zone controller 10b, and further transmitted to all the zone controllers in the conveying line via the upstream connector 17 and the downstream connector 18.

The conveyor system 1 of the embodiment is described, setting eyes on zone B. If CW/CCW signal of the supervisory controller indicates normal rotation, the detecting signal of the presence sensor SA in zone A is transmitted to zone B as the third presence signal (U-SNS) of the upstream zone, whereas the detecting signal of the presence sensor SC in zone C is transmitted to zone B as the second presence signal (D-SNS) of the downstream zone. The driving status signal of zone C is transmitted to zone B as the second driving status signal (D-RUN) of the downstream zone.

On the other hand, if the CW/CCW signal indicates reverse rotation, the detecting signal of the presence sensor SA in zone A is transmitted to zone B as the second presence signal (D-SNS) of the downstream zone, whereas the detecting signal of the presence sensor SC in zone C is transmitted to zone B as the third presence signal (U-SNS) of the upstream zone. The driving status signal of zone A is transmitted to zone B as the second driving status signal (D-RUN) of the downstream zone.

Briefly, CW/CCW signal transmitted from the supervisory controller 10 interchanges the upstream side and the downstream side of each of the zone controllers when the controller takes signals into account. For example, a data selector integrated circuit enables such interchange.

The calculating section 11 makes calculation based on the presence signals U-SNS, D-SNS, the presence signal S-SNS of the home zone B, and the driving status signal D-RUN of the downstream zone, so as to generate the driving status signal for controlling the motor M.

Figure 4:
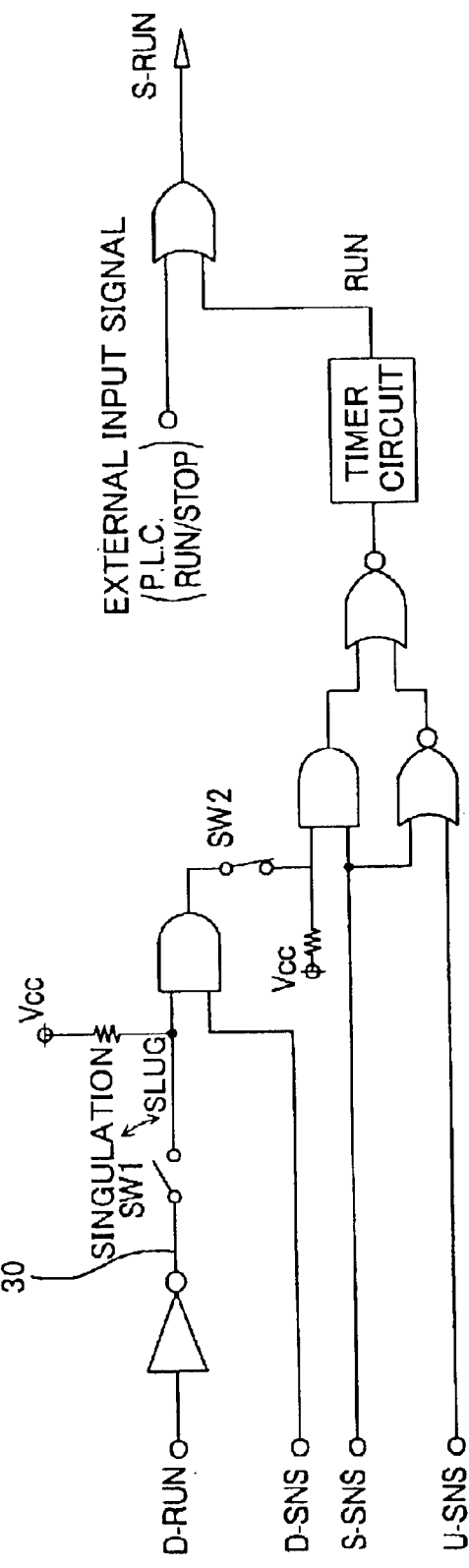
FIG. 4 is a diagram showing a logic circuit generating a conveying signal of a zone controller shown in FIG. 3 and the table of logical values thereof.

FIG. 4 shows an exemplary logic circuit for calculation in the calculating section 11 based on the signals, together with the table of logical values thereof.

If the CW/CCW signal indicates normal rotation, the logic circuit generates the controlling signal (RUN signal) for controlling a motorized roller 4a, based on the presence signal S-SNS of the control zone B, the presence signal U-SNS of the upstream zone, the presence signal D-SNS of the downstream zone, and the driving status signal D-RUN.

RUN signal thus generated is added to RUN/STOP signal (external output signal) transmitted from the supervisory controller 10 to yield logical sum, which is in turn outputted as a conveying signal S-RUN of zone B so as to control the motor M. The conveying signal S-RUN is outputted to the upstream zone A so as to be used as the driving status signal D-RUN. In other words, RUN signal transmitted from the supervisory controller 10 compulsorily actuates the control zone and, when RUN signal is not transmitted from the controller 10, control in each control zone is performed in accordance with the controlling signal in the zone.

The timer circuit in the logic circuit in FIG. 4 maintains the conveying signal (RUN signal) generated by the logic circuit for a predetermined duration. In other words, the timer circuit is for conveying the article conveyed from upstream to its home zone without fail and for conveying the article in the home zone to the downstream zone without fail, by maintaining the logically generated RUN signal for a predetermined duration. In this embodiment, the maintaining duration of the timer circuit is set equivalent to that required for the article to be conveyed from substantial center of control zone B to substantial center of control zone C.

Operations of the zone controller 10 in this embodiment based on the logic circuit and the logical values shown in FIG. 4 will be described referring to FIGS. 1 and 3. In the description, it is assumed that zone A is in the upstream and zone C is in the downstream.

The logic circuit is constructed by combining AND gates, a OR gate, NOR gates, and a NOT gate, and has a mode-setting switch SW1 as a setting device for selecting whether to use the second driving status signal D-RUN of the downstream zone in the logic calculation. A slug mode (a first conveyance control mode) is set when the mode-setting switch SW1 is closed, whereas a singulation mode (a second conveyance control mode) is set when the mode-setting switch SW1 is open. The switch SW1 is situated on the way of a signal wire 30 for transmitting the second driving status signal D-RUN, which is inputted via the input terminal 17, to the logic circuit (calculating circuit), thus enabling to determine whether the second driving status signal D-RUN should be used in the calculation by the calculating section 11.

This embodiment further incorporates a second mode-setting switch SW2 for setting the calculating section 11 in conveyance-forbidding mode (a third conveyance control mode). Conveyance control in the slug mode or the singulation mode is performed when SW2 is closed. When SW2 is open, the second driving status signal D-RUN and the presence signal D-SNS of the downstream zone are invalidated so that the driving status signal RUN is generated by logic calculation taking into account only the presence signal S-SNS of the home zone and the presence signal U-SNS of the upstream zone.

RUN signals shown in the table of logical values in FIG. 4 are obtained as outputs in the slug mode and the singulation mode. Operation in each mode is as the following:
(Slug Mode)
(1) With the motorized roller in zone C in a "run" status (with the driving status signal D-RUN of the downstream zone C at H level):
The motorized roller of the home zone B is driven if any article exists in either or both of the zone B and the upstream zone A.
(2) With the motorized roller in the downstream zone C in a "halt" status (with the driving status signal D-RUN of the downstream zone C at L level):
The motorized roller of zone B is driven if any article exists both in the upstream zone A and the downstream zone C and not in the home zone B.
If no article exists in the downstream zone C, the motorized roller of the home zone B is driven if any article exists in either or both of the zone B and the upstream zone A.

(Singulation Mode)

(1) With any article in the downstream zone C:

The motorized roller of the home zone B is driven if no article exists in the home zone B and any article exists in the upstream zone A.

(2) With no article in the downstream zone C:

The motorized roller of the home zone B is driven if any article exists in either or both of the home zone B and the upstream zone A.

(Conveyance-forbidding Mode)

If a zone is set in the conveyance-forbidding mode, the motorized roller of the home zone is driven only when no article exists in the home zone and any article exists in the upstream zone, thus forbidding conveyance to the downstream zone.

The invention is not limited to the illustrated example in which the second setting device is formed by a switch SW2 that validates or invalidates the output signal of the AND gate outputting the logical multiplication of D-RUN signal and D-SNS signal. For example, the invention may be embodied by compulsorily applying signals at L level and H level to the terminals for the driving status signal (D-RUN) and presence signal (D-SNS), respectively, in the input section 12 of the downstream connector 17 of the zone controller.

Situations of articles conveyed on the conveyor line based on the controlling signal generated by the logic circuit shown in FIG. 4 in the slug mode and the singulation mode will be described referring to FIGS. 5 to 7.

FIGS. 5(a) to (f) and 6(a) to (f) are diagrams illustrating situations of conveying articles on the conveyor line made up of control zones whose zone controllers 10 are set in the slug mode. The left of the conveyor line is the upstream and the right thereof is the downstream. The zone controller at the downstream end is set in the conveyance-forbidding mode.

Figure 5:
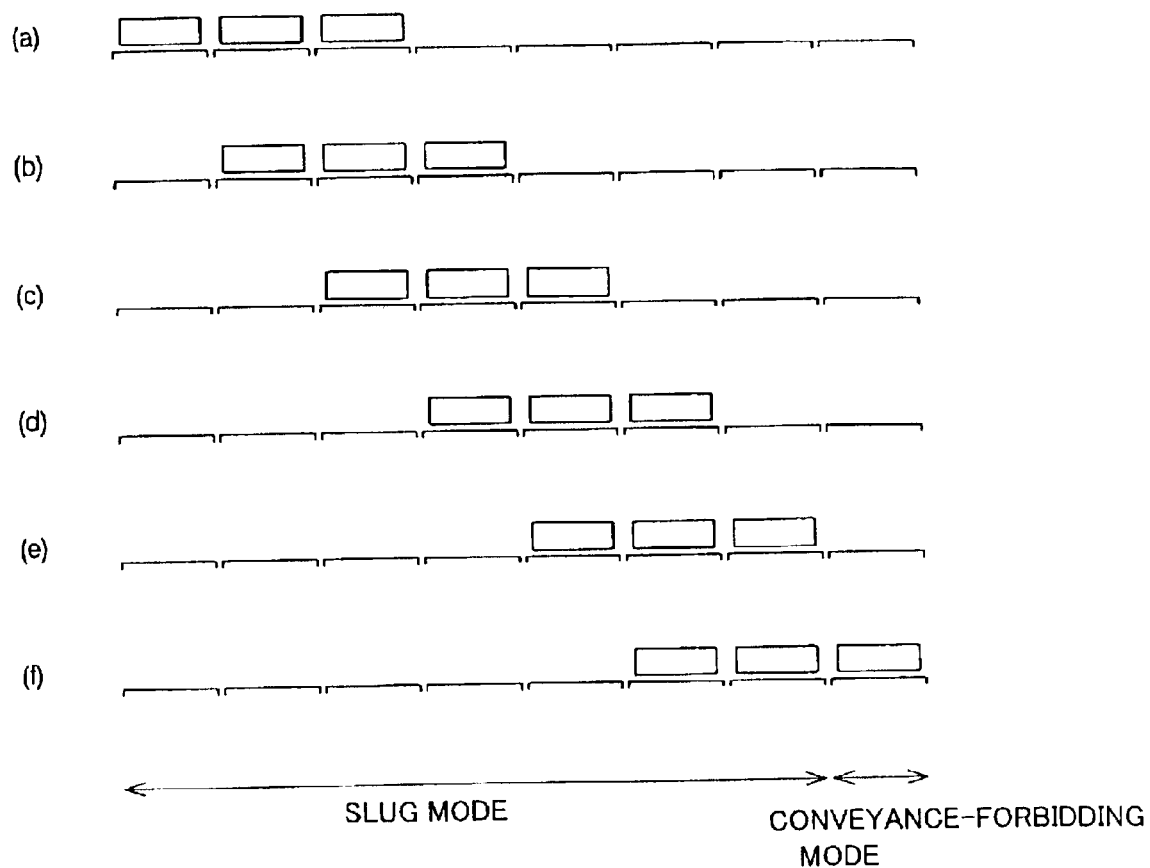
FIG. 5 is a diagram illustrating a set of situations of conveying articles performed through the zones in each of which a logic circuit as shown in FIG. 4 is set in a slug mode.

In the slug mode, if three articles come from upstream one after another and without substantial intervals (i.e., interposing no zone having no article), the three articles are conveyed maintaining the arrangement order, that is, the three articles are conveyed downstream uniformly without substantial intervals, as shown in FIG. 5.

Figure 6:
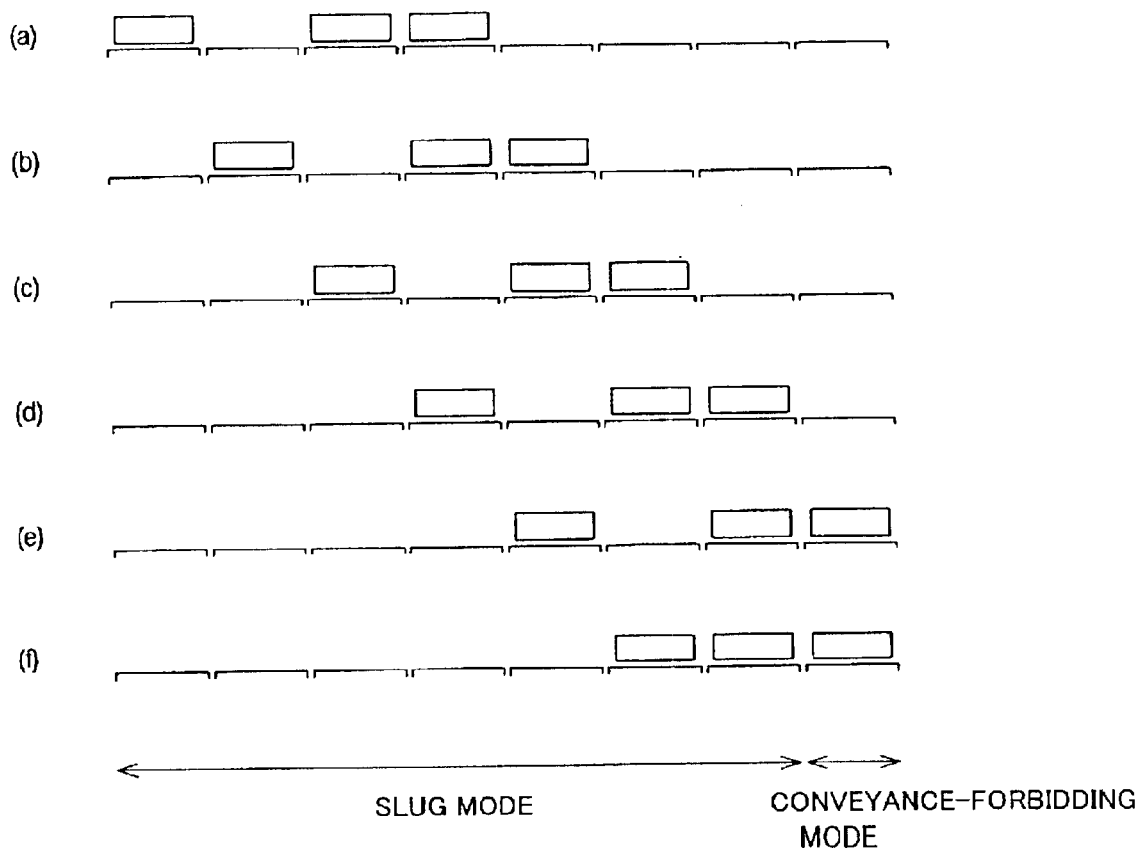
FIG. 6 is a diagram illustrating another set of situations of conveying articles performed through the zones in each of which a logic circuit as shown in FIG. 4 is set in a slug mode.

As shown in FIG. 6, if articles come from upstream with substantial interval, the articles are conveyed downstream uniformly maintaining the interval.

However, conveying downstream is forbidden in the control zone that is set in the conveyance-forbidding mode. Even in the slug mode, after arrival of an article at the control zone at the downstream end of the conveyor line (hereinafter called "the end zone"), the articles are conveyed so that an article is held in the adjacent upstream zone of the end zone without substantial interval.

Thus efficient conveyance is achieved by the slug mode, with motorized rollers of the control zones driven at a predetermined rotational rate.

The logic circuit shown in FIG. 4 is switched into the singulation mode by opening the mode-setting switch. Conveyance in the singulation mode will be described referring to FIG. 7.

Figure 7:
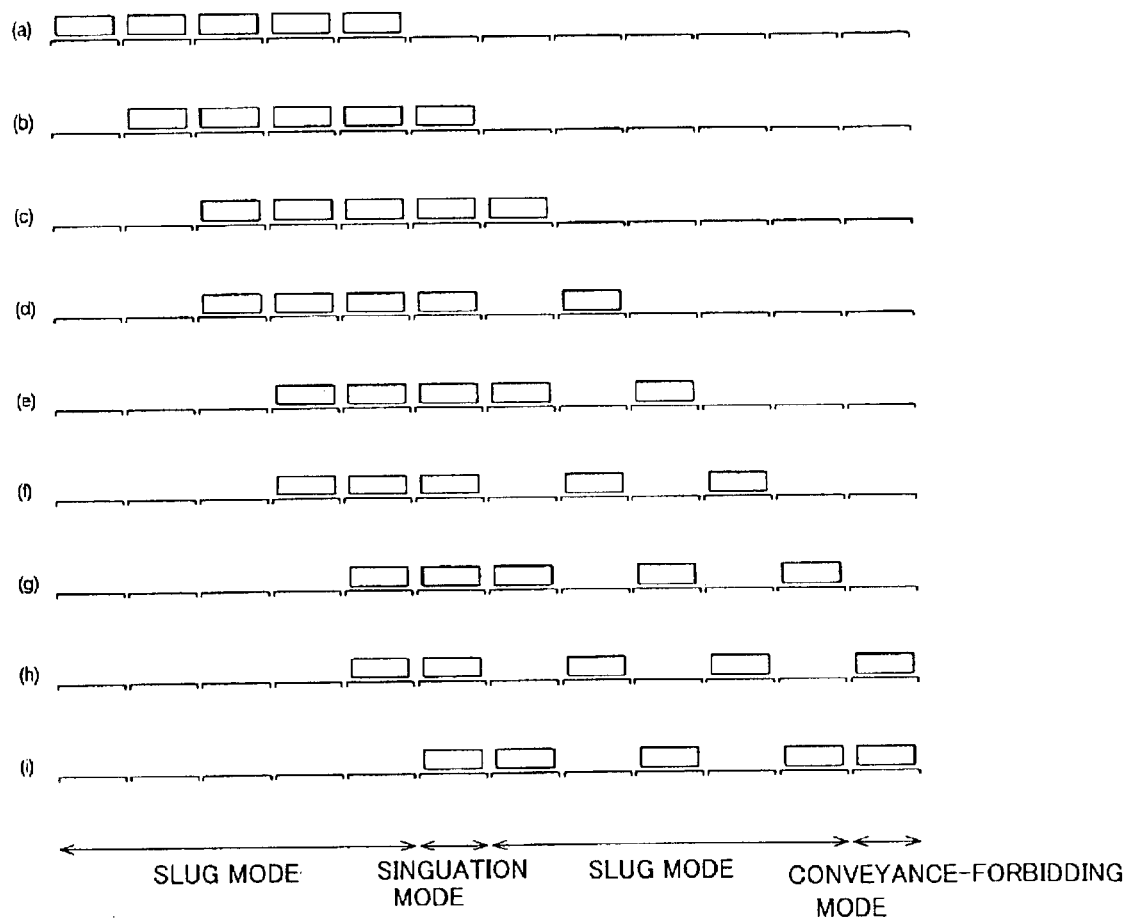
FIG. 7 is a diagram illustrating a set of situations of conveying articles performed through the zones consisting of zones in which logic circuits as shown in FIG. 4 are set in slug modes and a zone in which a logic circuit as shown in FIG. 4 is set in a singulation mode.

FIG. 7 illustrates a conveyor line made up of first kind of control zones set in the slug mode and a second kind of control zone set in the singulation mode and interposed between the first kind of zones. The end zone is set in the conveyance-forbidding mode.

In the conveyor line, the first kind of zones set in the slug mode convey articles, which have been conveyed one after another from upstream, substantially with no intervals to downstream, as shown in FIG. 7(a). In the second kind of zone set in the singulation mode, articles are conveyed generally in similar manner to those in the slug mode, with conveyance to downstream restricted in particular conditions.

More specifically, if an article exists in the home zone (i.e., the control zone set in the singulation mode) and another article exists in the downstream zone, the article in the home zone is not conveyed until the other article is conveyed out of the downstream zone. Thus zones downstream of the zone set in the singulation mode are made into zones carrying articles and zones not carrying articles alternately. The articles are conveyed downstream in slug mode, maintaining the order.

Also in this conveyor line, conveyance to downstream is forbidden in the control zone set in the conveyance-forbidding mode. More specifically, if an article reaches the end zone, conveyance of the article to further downstream is forbidden. Other conveyed articles are held on the adjoining zones upstream of the end zone and set in the slug mode, without substantial intervals, thus achieving the zero-pressure accumulating conveyance.

As shown above, by setting a zone controller for a particular control zone in the singulation mode, articles having conveyed with substantially no intervals or with intervals each consisting of a zone and distributed randomly can be conveyed regularly, with zones each having an article and zones having no article arranged alternately.

In the description above, only one control zone that is set in the singulation mode is situated between control zones set in the slug mode. However, conveyance similar to that shown in FIG. 7 can also be accomplished by setting a plurality of adjoining control zones in the singulation mode.

As described, by means of the conveyor line made up of the zone controllers embodying the invention, an efficient slug conveyance and a singulation conveyance with intervals are accomplished by only switching conveyance mode in each control zone, instead of changing driving speed of the driving rollers of the control zone.

Especially, even in an existing conveyor line, the equivalent conveying speed can be varied by only switching the modes in suitable control zones, enabling flexible response in the work on the conveyor line.

By setting in the singulation mode, driving timing of motorized rollers is deconcentrated as compared with the slug mode, thus reducing the maximum electric power required for the conveyor line.

Though the above embodiment involves a logic circuit including logic gates with the mode-setting means 14 involving mode-setting switches SW, the embodiments are not limited to such a construction.

For example, controlling signal equivalent to that of the logic circuit may be generated through program processing in CPU and the program processing may be switched in compliance with the operation of the mode-setting switch SW.

A plurality of circuits for generating controlling signal may be provided one for a mode and the circuits may be switched and selected by means of a mode-setting switch SW.

As described above, the invention provides zone controllers that enable easy switching and setting of time interval of arrival of the articles by merely setting mode in each control zone and accomplish flexible change and setting of conveyance mode in accordance with the shape of the conveyor line and accompanying work.

The invention provides zone controllers that enable easy switching and setting of the conveying mode by simple construction and accomplish flexible change and setting of the conveyor line in accordance with the work and the like. Additionally, the invention provides inexpensive zone controllers enabling easy manufacture.

Zone controllers that simplify connection of electric cables are provided as signals necessary for the control are transmitted mutually by only connecting zone controllers in the adjoining zones sequentially via cables.

What is claimed is:

1. A zone controller for a particular zone picked from a plurality of zones for control into which a roller conveyor line is divided and which are arrangeable in a row in the direction of conveyance, being capable of controlling operation of a driving roller for conveyance provided in the particular zone, having a mode-setting means capable of switching between a slug mode and a singulation mode:

wherein in the slug mode operation of the driving roller is controlled so that articles in the zones are conveyed uniformly to downstream, maintaining the order of the articles in the conveying line;

wherein in the singulation mode operation of the driving roller is controlled so that the articles are conveyed separately to downstream with a predetermined number of zones in which no article exists kept between the zones in which the articles exist;

wherein the zone controller is capable of receiving presence signals and a driving status signal, the presence signals indicating whether an article exists in the particular zone, in a zone upstream of the particular zone, and in a zone downstream of the particular zone, the driving status signal indicating a driving status of a driving roller for conveyance in a zone downstream of the particular zone; and wherein the zone controller generates a controlling signal for controlling operation of the driving roller in the particular zone, taking the presence signals into account if the mode-selling means is switched in the singulation mode, taking the presence signals and the driving status signal into account if the mode-setting means is switched in the slug mode.

2. A zone controller for a particular zone picked from a plurality of zones for control into which a roller conveyor line is divided and which are arrangeable in a row in the direction of conveyance, being capable of controlling operation of a driving roller for conveyance provided in the particular zone comprising:

an input section for input of a driving status signal indicating a driving status of a driving roller for conveyance in a zone other than the particular zone;

a calculating section for receiving a plurality of signals and for generating, based on the signals, a controlling signal for controlling operation of the driving roller, the signals including the driving status signal transmitted to the input section; and a mode-setting means for switching modes of control of operation of the driving roller by selecting whether the driving status signal is involved in the calculation by the calculating section.

3. The zone controller according to claim 2, further comprising an output section for output of a driving status signal indicating driving status of a driving roller for conveyance in the particular zone.

4. The zone controller according to claim 2, wherein the calculating section performs calculating, taking into account the driving status signal of a zone downstream of the particular zone if the mode-setting means is switched in the slug mode, and not taking into account the driving status signal of the downstream zone if the mode-setting means is switched in the singulation mode.

5. The zone controller according to claim 2, further comprising an upstream connector for connection to a zone controller of a zone upstream of the particular zone and a downstream connector for connection to a zone controller of a zone downstream of the particular zone, wherein each of the upstream and downstream connectors accommodates at least one selected from the input section and the output section.

6. A zone controller for controlling a first driving motor for conveyance in a first conveyor unit that defines a zone forming a part of a conveyor line, comprising:

a calculating circuit for generating a first driving status signal indicating whether to actuate the first driving motor of the first conveyor unit by calculation using a plurality of parameters;

an input terminal for inputting a second driving status signal, which is generated by another calculating circuit of another zone controller for controlling a second driving motor for conveyance in a second conveyor unit, as one of the parameters; and a setting device for deciding whether to use the second driving status signal in the calculation.

7. The zone controller according to claim 6, wherein the setting device is a switch provided along a signal line for transmitting the second driving status signal, which is inputted via the input terminal, to the calculating circuit.

8. The zone controller according to claim 6, further comprising a motor-controlling circuit connected electrically to the first driving motor and for receiving the first driving status signal, wherein the motor-controlling circuit is capable of generating, based on the first driving status signal, a drive control signal that actuates or halts the first driving motor and outputting the drive control signal to the first motor.

9. The zone controller according to claim 6, wherein the parameters include the second driving status signal, a first presence signal indicating whether an article exists on the first conveyor unit, a second presence signal indicating whether an article exists on the second conveyor unit, and a third presence signal indicating whether an article exists on a third conveyor unit.

10. The zone controller according to claim 9, wherein the second conveyor unit defines a zone downstream of the first conveyor unit and the third conveyor unit defines a zone upstream of the first conveyor unit.

11. The zone controller according to claim 9, wherein the setting device is capable of switching the calculating circuit between a first control mode and a second control mode, wherein in the first control mode the calculating circuit generates the first driving status signal RUN by a logic calculation shown in formula (1) identified below, whereas in the second control mode the calculating circuit generates the first driving status signal RUN by a logic calculation shown in formula (2) identified below, in formula (1) and (2) the first presence signal, the second presence signal, the third presence signal, the first driving status signal, and the second driving status signal being represented by S-SNS, D-SNS, U-SNS, RUN, and D-RUN, respectively.

$$RUN=((D\text{-}RUN)rev \cdot D\text{-}SNS \cdot S\text{-}SNS+(S\text{-}SNS+U\text{-}SNS)rev)rev \quad \text{(Formula 1)}$$

$$RUN=(D\text{-}SNS \cdot S\text{-}SNS+(S\text{-}SNS+U\text{-}SNS)rev)rev \quad \text{(Formula 2)}.$$

12. The zone controller according to claim 11, further comprising a second setting device being capable of changing the calculating circuit into a third control mode in which the calculating circuit generates the first driving status signal RUN by a logic calculation shown in formula (3) identified below.

$$RUN = (S\text{-}SNS + (S\text{-}SNS + U\text{-}SNS)\text{rev})\text{rev} \quad \text{(Formula 3)}.$$

* * * * *